(12) United States Patent
Davidson

(10) Patent No.: US 7,578,193 B2
(45) Date of Patent: Aug. 25, 2009

(54) METHOD OF MEASURING VIBRATION ON A DEVICE

(75) Inventor: Lincoln Davidson, Moorhead, MN (US)

(73) Assignee: Sauer-Danfoss Inc., Ames, IA (US)

(*) Notice: Subject to any disclaimer, the term of this patent is extended or adjusted under 35 U.S.C. 154(b) by 496 days.

(21) Appl. No.: 11/427,022

(22) Filed: Jun. 28, 2006

(65) Prior Publication Data

US 2008/0000301 A1   Jan. 3, 2008

(51) Int. Cl.
G01H 11/08 (2006.01)
(52) U.S. Cl. .................................... 73/661
(58) Field of Classification Search .................. None
See application file for complete search history.

(56) References Cited

U.S. PATENT DOCUMENTS

| | | | |
|---|---|---|---|
| 4,475,401 A * | 10/1984 | Punia et al. ............... 73/658 |
| 5,044,455 A | 9/1991 | Tecco et al. | |
| 5,536,059 A | 7/1996 | Amirouche | |
| 5,736,970 A | 4/1998 | Bozeman, Jr. | |
| 5,854,994 A | 12/1998 | Canada et al. | |
| 5,899,288 A | 5/1999 | Schubert et al. | |
| 6,029,764 A | 2/2000 | Schubert | |
| 6,490,929 B1 | 12/2002 | Russell et al. | |
| 6,490,930 B1 * | 12/2002 | Ohkubo et al. ............. 73/661 |
| 6,892,581 B2 | 5/2005 | Robinson et al. | |
| 7,036,703 B2 * | 5/2006 | Grazioli et al. ............ 227/10 |
| 7,210,356 B2 * | 5/2007 | Bernhagen ................. 73/661 |
| 2004/0102880 A1 | 5/2004 | Brown | |
| 2004/0231420 A1 | 11/2004 | Xie et al. | |
| 2004/0239491 A1 | 12/2004 | Koutsky et al. | |
| 2005/0160814 A1 | 7/2005 | Vaganov et al. | |
| 2007/0038354 A1 | 2/2007 | Kang | |

2008/0134794 A1 * 6/2008 Jonsson ..................... 73/660

FOREIGN PATENT DOCUMENTS

| DE | 10039978 | 5/2001 |
| DE | 10250321 | 6/2003 |

(Continued)

OTHER PUBLICATIONS

Copyrighted by the International Organization for Standardization, Mechanical vibration and shock—Evaluation of human exposure to whole-body vibration, Part 1: General Requirements; Ref. No. ISO 2631-1.1997(E), Second Edition Jun. 1, 1997.

*Primary Examiner*—Hezron Williams
*Assistant Examiner*—Rose M Miller

(57) ABSTRACT

A method of measuring vibration on an operational device. The method includes providing an operational device with a control unit and a vibration sensor having a three axis accelerometer, a digital signal processor, and a communications transceiver. The digital signal processor takes the raw vibration data for each axis of the three axis accelerometer and applies a weighting function to the vibration data for each individual axis. Then stress level data associated with the vehicle operator is used to calculate the instantaneous contributions of the filtered data to the stress level data of the operator to determine instantaneous stress level data that has accumulated over a fixed time interval. After the fixed time interval, the digital signal processor calculates an increase of the stress level of the operator during the time interval to create stress data that is transmitted through a communications transceiver for display.

8 Claims, 2 Drawing Sheets

FOREIGN PATENT DOCUMENTS

| | | |
|---|---|---|
| DE | 10 2004 045 141 A1 | 3/2006 |
| DE | 10 2004 061 574 A1 | 7/2006 |
| EP | 1 050 749 A1 | 11/2000 |
| EP | 1 149 004 | 10/2001 |
| EP | 1 624 289 A2 | 8/2006 |
| EP | 1 693 655 A2 | 8/2006 |
| SU | 769353 B * | 10/1980 |
| SU | 1821650 A1 * | 6/1993 |
| WO | WO 2006/080880 A1 * | 8/2006 |

* cited by examiner

METHOD OF MEASURING VIBRATION ON A DEVICE

BACKGROUND OF THE INVENTION

This invention relates to a method of measuring vibration. More specifically, this invention relates to a method of measuring vibration on an operational device using a vibration sensor having a three axis accelerometer.

Vibration contributes to operator fatigue and can cause or contribute to work related injury and health problems. Typically, vibration sensors are mounted onto a vehicle in order to determine the stresses that an operator undergoes during operation of a vehicle or heavy equipment. Vibration measurement requires some measurement of displacement, velocity, or acceleration. In a high frequency vibration, acceleration measurement is more sensitive than displacement or velocity and hence, better suited for measuring vibration in a vehicle or machinery. ISO (International Organization for Standardization) has also set forth rules for measuring vibration in vehicles that require translation acceleration measurement. Typically, this acceleration is measured by using an accelerometer that works in association with the control unit of the device.

Present vibration sensors are ineffective at measuring the true effect vibrations have on a vehicle operator. Traditionally, the more sensitive the vibration sensor is then typically the larger the bandwidth of the outgoing information thus causing an increase size in equipment and cost.

Thus, it is the principal object of the present invention to provide a method of measuring vibration on an operational device that increases the accuracy of the determined vibration and stress levels.

Yet another object of the present invention is to provide a vibration sensor that reduces the size and cost of equipment needed to detect vibration and stress level data.

These and other objects, features, or advantages of the present invention will become apparent from the specification and claims.

BRIEF SUMMARY OF THE INVENTION

The method of measuring vibration on an operational device includes providing an operational device having a control unit in communication with a vibration sensor that is comprised of a three axis accelerometer, a digital signal processor and a communications transceiver. The method further involves determining vibration data with the three axis accelerometer and filtering that vibration data with a weighting function within the digital signal processor. With consideration of stress level data associated with an operator, stress data is calculated in three separate blocks. This stress data information is then transmitted through the communication transceiver.

DETAILED DESCRIPTION OF THE PREFERRED EMBODIMENT

Figure 1:
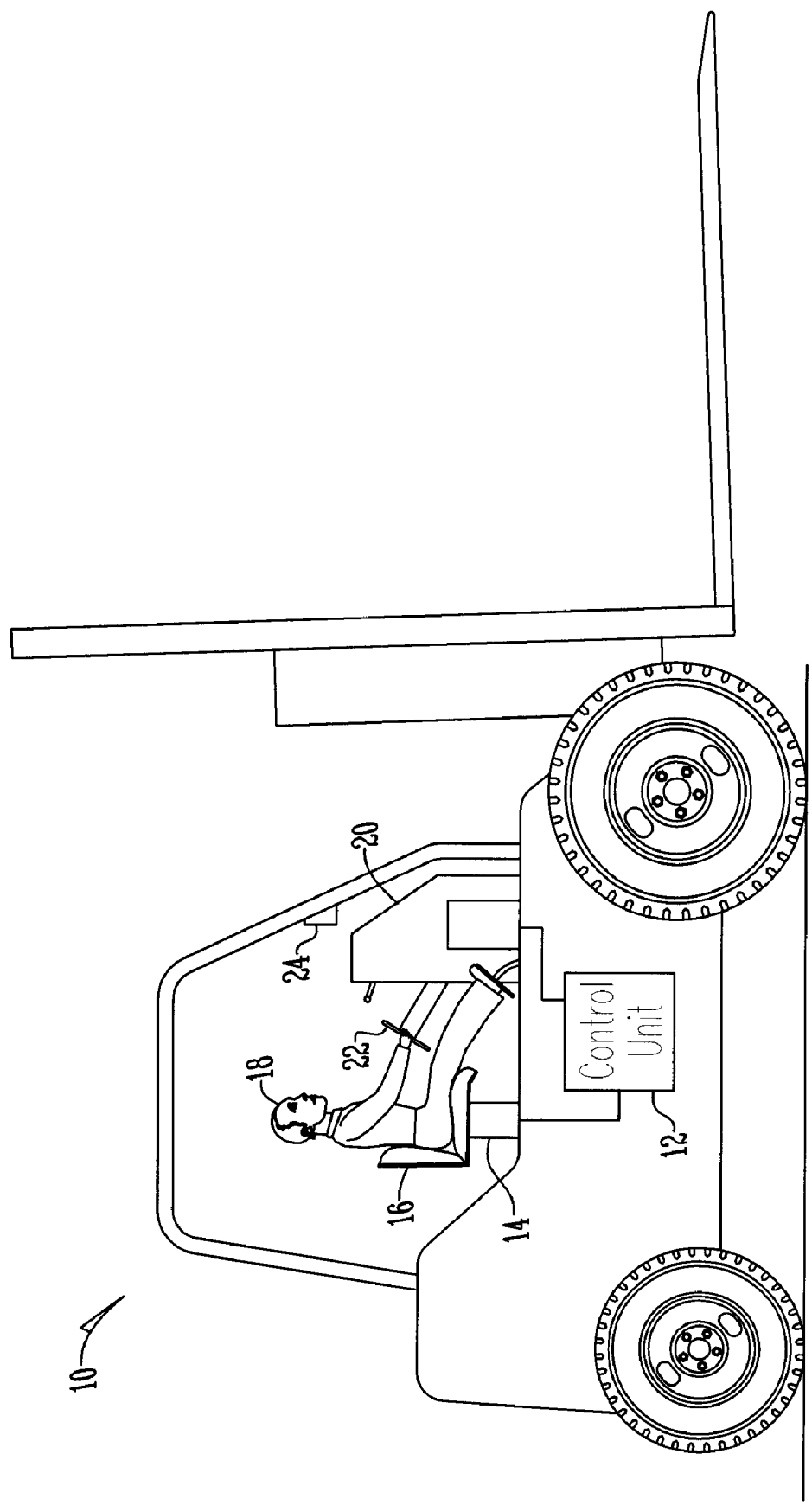
FIG. 1 is a plan side view of an operational device using a vibration sensor.

FIG. 1 shows an operational device 10 having a control unit 12 and a vibration sensor 14. In this figure the operational device is shown as a fork lift or vehicle but in another embodiment is heavy equipment. Additionally, in this figure the vibration sensor is shown on a seating device 16 of an operator 18; however, in another embodiment may be associated with the control panel 20 or a steering device 22. Specifically, the sensor 14 is mounted at any point of contact between the vehicle or machinery 10 and the operator 18 to monitor a vibration detected by the operator 18. If the sensor 14 is mounted on the seating device 16 or on a platform on which the operator 18 stands, the sensor 14 measures the vibration of the operator's entire body. In another embodiment when the sensor 14 is mounted on a hand or foot control the sensor measures the vibration of an operator's hands or feet. Specifically, the vibration sensor 14 measures the intensity of instantaneous shocks as well as the average vibration energy that the operator absorbs over time and calculates a fatigue level for the operator based on these measurements. Thus, in one embodiment the sensor 14 is able to send these measurements to a display device 24 such that the operator 18 of the vehicle could observe the display and take appropriate action if the fatigue level reaches a regulatory limit.

Figure 2:
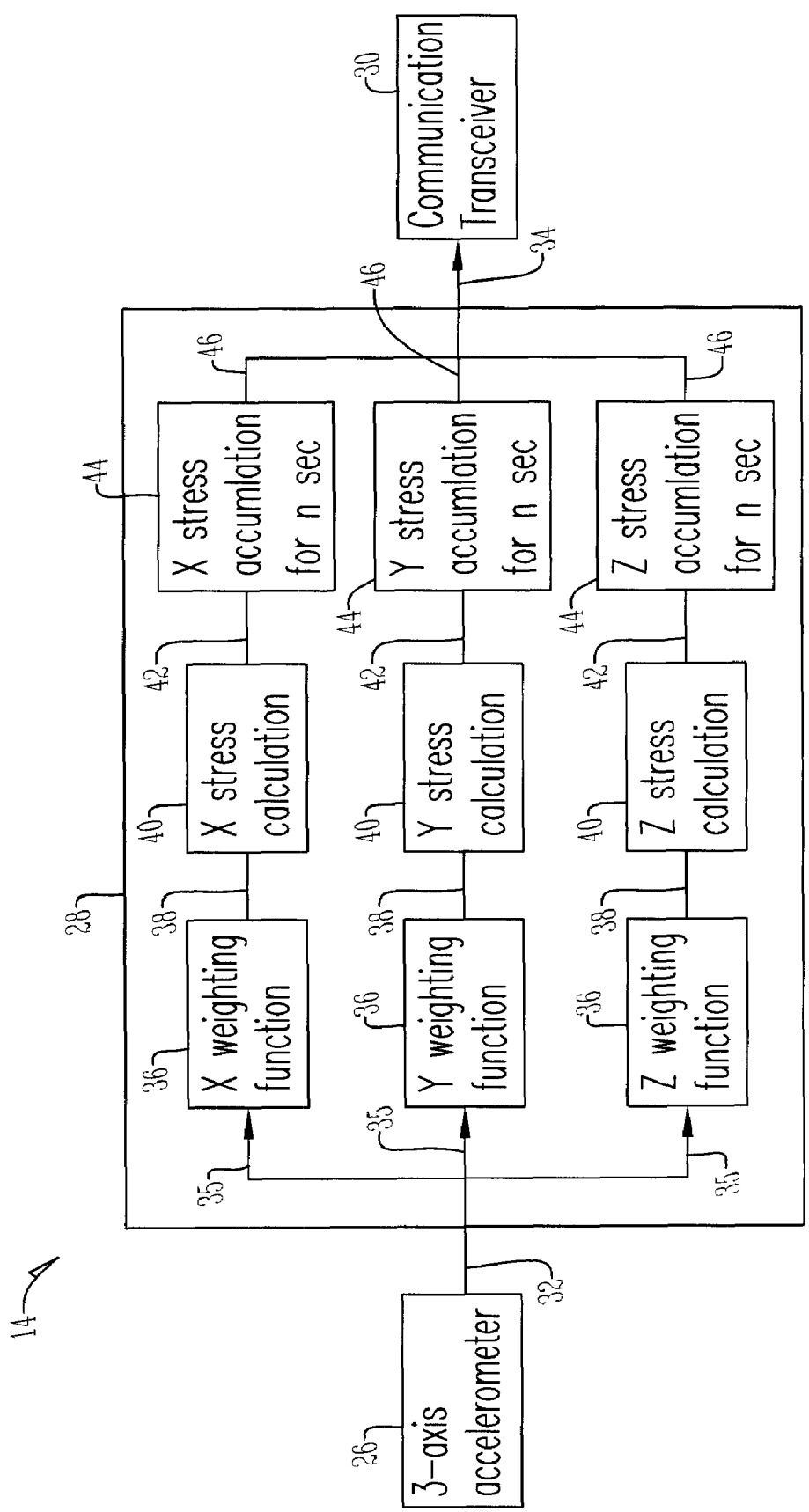
FIG. 2 is a schematic block diagram of a vibration sensor.

FIG. 2 shows a vibration sensor 14. The vibration sensor 14 comprises a three axis accelerometer 26, a digital signal processor (DSP) 28, and a communication transceiver 30. The three axis accelerometer 26 responds to acceleration in three mutually perpendicular axes and sends measurements to the digital signal processor in digital form. For example only, one version of the three axis accelerometer 26 is described in U.S. Ser. No. 10/983,445 and that three axis accelerometer is incorporated within this reference.

The DSP 28 takes input data 32 from the three axis accelerometer 26 and processes the information to provide an output signal 34 to send to the communication transceiver. Within the DSP 28 the vibration data for each axis within the input signal 32 is separated into a plurality of data streams 35 that are filtered with a weighting function 36 that matches human sensitivity for each of the three axes provided by the three axis accelerometer 26. The DSP 28 then takes the filtered vibration data, or filtered data, and calculates the instantaneous contribution of the filtered data 38 to the stress level of the operator 18 to determine a stress calculation 40 in each axis and to determine instantaneous stress level data 42. The instantaneous stress level data 42 then accumulates over a fixed time interval 44. Based upon this accumulated instantaneous stress level data 42 the DSP 28 calculates the increase to the operator stress level for that time interval to provide accumulated data, or stress data 46, that is transmitted through the output signal 34 to the communications transceiver 30. The communication transceiver then sends the accumulated data to another device for further processing, storage, or display.

In operation, the method of measuring vibration of an operational device 10 comprises the steps of providing an operational device 10 having a control unit 12 in communication with a vibration sensor 14. The vibration sensor 14 is comprised of a three axis accelerometer 26, a digital signal processor 28, and a communication transceiver 30. The next step involves determining vibration data for each axis with the three axis accelerometer 26 and implementing this vibration data within an input signal 32. The next step requires filtering the vibration data with an input signal 32 for each axis with a weighting function 36 to create filtered data 38. During this time, stress level data is determined that is associated with the operator and the DSP 28 calculates the instantaneous contributions of the filtered data 38 to the stress level data of the operator 18 to determine instantaneous stress level data 42. The method then involves accumulating the instantaneous stress level data over a fixed time interval 44 and calculating an increase of stress level of the operator 18 during the time interval to create stress data 46 for each axis. Thus, the stress data is separated into three series of non overlapping blocks that form a single output signal 34 that is sent to the communication transceiver 30. In a preferred embodiment the stress data 46 within each block is represented only by a number thus minimizing the outgoing bandwidth of the output signal 34. The final step of the method involves transmitting the stress data 46 through the communications transceiver 32 to another device for processing, storage, display or the like.

Thus, a method is presented wherein raw vibration data from a three axis accelerometer is separated into three continuous data streams 35 that represent the instantaneous stress on the operator for each of the three axes. By accumulating the instantaneous stress level data over a fixed time interval the bandwidth needed to transmit the resulting stress data to the communication transceiver is reduced. This is accomplished by breaking the continuous streams of stress data 46 into three series of non overlapping blocks. The data within each block is accumulated into a single number which is then transmitted to a receiving device. As a time interval for each block increases, the rate at which the accumulated data is sent, decreases. A time range interval in the range of 0.1 to 10 seconds would be typical and requires little bandwidth to transmit. Thus, at the very least all of the stated objectives have been met.

It will be appreciated by those skilled in the art that other various modifications could be made to the device without the parting from the spirit in scope of this invention. All such modifications and changes fall within the scope of the claims and are intended to be covered thereby.

What is claimed is:

1. A method of measuring vibration on an operational device steps comprising:
   providing a vibration sensor comprised of a three axis accelerometer, a digital signal processor and a communications transceiver;
   determining vibration data for each axis of the three axis accelerometer;
   filtering the vibration data for each axis with a weighting function to create instantaneous stress data for each axis;
   accumulating the instantaneous stress data to determine an accumulated stress level;
   transmitting the stress data through the communications transceiver; and
   separating the stress data into three series of non-overlapping blocks.

2. The method of claim 1 wherein the weighting function matches human sensitivity for the axis.

3. The method of claim 1 wherein the accumulated stress level is transmitted to a processing device.

4. The method of claim 1 wherein the accumulated stress level is transmitted to a storage device.

5. The method of claim 1 wherein the stress data is transmitted to a display.

6. The method of claim 1 wherein the stress data within each block is represented by a number.

7. The method of claim 1 wherein the operational device is a vehicle.

8. The method of claim 1 wherein the operational device is heavy equipment.

* * * * *